US012440860B2

(12) United States Patent
Geutjens

(10) Patent No.: US 12,440,860 B2
(45) Date of Patent: Oct. 14, 2025

(54) SYSTEM AND METHOD FOR COATING A SURFACE

(71) Applicant: QLAYERS HOLDING B.V., s-Gravenhage (NL)

(72) Inventor: Ruben Geutjens, Vlaardingen (NL)

(73) Assignee: QLAYERS HOLDING B.V., 's-Gravenhage (NL)

(*) Notice: Subject to any disclaimer, the term of this patent is extended or adjusted under 35 U.S.C. 154(b) by 540 days.

(21) Appl. No.: 17/612,976

(22) PCT Filed: May 27, 2020

(86) PCT No.: PCT/EP2020/064633
§ 371 (c)(1),
(2) Date: Nov. 19, 2021

(87) PCT Pub. No.: WO2020/239798
PCT Pub. Date: Dec. 3, 2020

(65) Prior Publication Data

US 2022/0250107 A1 Aug. 11, 2022

(30) Foreign Application Priority Data

May 28, 2019 (NL) ..................................... 2023223
May 28, 2019 (NL) ..................................... 2023224

(51) Int. Cl.
*B05B 12/08* (2006.01)
*B05B 1/28* (2006.01)
(Continued)

(52) U.S. Cl.
CPC .............. *B05B 12/082* (2013.01); *B05B 1/28* (2013.01); *B05B 7/00* (2013.01); *B05B 7/1606* (2013.01);
(Continued)

(58) Field of Classification Search
None
See application file for complete search history.

(56) References Cited

U.S. PATENT DOCUMENTS 4,024,815 A 5/1977 Platsch
7,954,448 B2 * 6/2011 Yasui ...................... B05D 1/02 118/308

(Continued)

FOREIGN PATENT DOCUMENTS

CN 200954481 Y * 10/2007 .............. B05D 7/02
JP H05-104046 A 4/1993

OTHER PUBLICATIONS

CN200954481Y English translate, (Year: 2007).*
Netherlands Search Report and Written Opinion dated Feb. 11, 2020, corresponding to Application No. NL 2023223.

(Continued)

*Primary Examiner* — Jethro M. Pence
(74) *Attorney, Agent, or Firm* — Patterson + Sheridan, LLP

(57) ABSTRACT

The present invention relates to a system (1) and a method for coating a surface (3*a*) of an object (3) with a spray coating tool (2) spraying atomised coating particles (10) onto. A conditioning hood (20) is applied defining a spray chamber. In operation the spray coating tool (2) is mounted at a coating tool mounting end (21), and an output end (22) is positioned in proximity of the surface (3*a*) of the object (3) to be coated. The spray coating tool (2) is operated to spray atomised coating particles (10) which travel from the coating tool (2), through the spray chamber and the output end (22) to the surface (3*a*) of the object (3). A carrier gas is injected that in operation carries the atomised coating particles (10) to the surface (3*a*) of the object (3).

7 Claims, 4 Drawing Sheets

Figure 1:
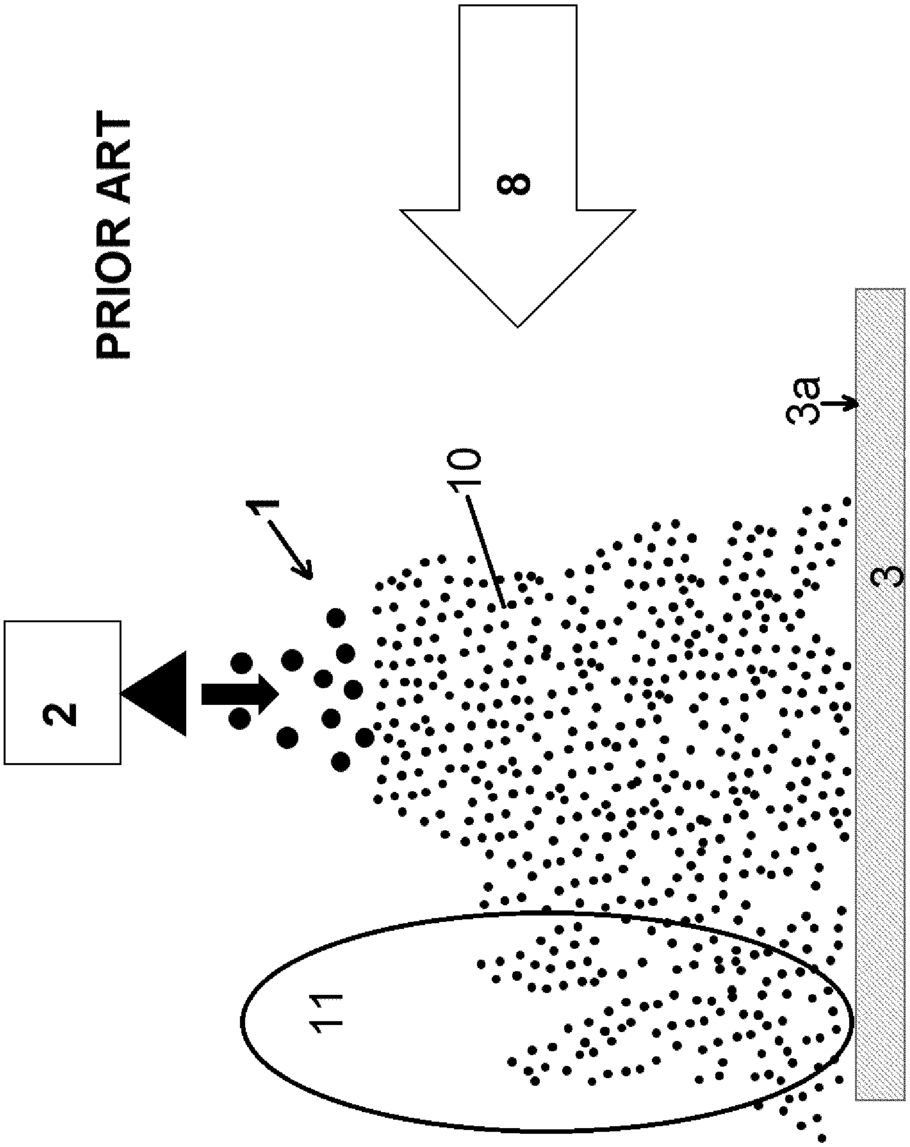

(51) Int. Cl.

| | |
|---|---|
| ***B05B 7/00*** | (2006.01) |
| ***B05B 7/16*** | (2006.01) |
| ***B05B 7/24*** | (2006.01) |
| ***B05B 9/01*** | (2006.01) |
| ***B05B 12/18*** | (2018.01) |
| ***B05B 14/30*** | (2018.01) |
| ***G01N 15/02*** | (2024.01) |
| ***G01N 15/0205*** | (2024.01) |
| *G01N 15/00* | (2006.01) |

(52) U.S. Cl.

CPC .............. *B05B 7/2491* (2013.01); *B05B 9/01* (2013.01); *B05B 12/18* (2018.02); *B05B 14/30* (2018.02); *G01N 15/0205* (2013.01); *G01N 2015/0026* (2013.01)

(56) References Cited

U.S. PATENT DOCUMENTS

| | | | | |
|---|---|---|---|---|
| 10,632,746 | B2 * | 4/2020 | Christenson | B05B 1/30 |
| 10,850,510 | B2 * | 12/2020 | Christenson | B41J 2/175 |
| 11,623,273 | B2 * | 4/2023 | Hosek | B05C 5/001 419/26 |
| 11,794,200 | B2 * | 10/2023 | Leveille | B05B 5/03 |
| 2016/0228901 | A1 * | 8/2016 | Hooper | B05B 12/008 |
| 2018/0021799 | A1 | 1/2018 | Raman et al. | |

OTHER PUBLICATIONS

International Search Report and Written Opinion dated Aug. 27, 2020, corresponding to Application No. PCT/EP2020/064633.

* cited by examiner

SYSTEM AND METHOD FOR COATING A SURFACE

The present invention relates to a system and method for coating a surface of an object with a spray coating tool spraying atomised coating particles, for example paint.

It is known to cover the surfaces of such objects with one or more layers of coatings, contributing to the protection of the object. Such layers are applied by a robot or a person operating a spray coating tool such as a spray-gun, with which atomised coating particles are applied to the object from a relatively short distance.

However, due to wind and other environmental factors, a substantial part of the atomised coating particles escapes and is deposited on areas where it is not wanted. This phenomena is also referred to as overspray. As a result, on the one hand, the efficiency of the application of the coating material is relatively low and, on the other hand, problems arise for the environment.

For example from U.S. Pat. No. 5,688,323 an enclosure is known which is disposed at a very short distance from the object to be treated, and wherein a person is located with the upper body inside the enclosure and with the lower body outside it. A vacuum is created in the enclosure with a fan, wherein air is drawn out from the slit between the enclosure and the surface to be processed.

From EP2859960 a conditioning hood is known, to be positioned between a coating tool and the object to be treated.

The object of the present invention is to provide an alternative solution to reduce the problems associated with overspray.

According to the invention, the system for coating a surface of an object with a spray coating tool spraying atomised coating particles, for example paint, comprises

- a conditioning hood defining a spray chamber and having a coating tool mounting end,
  - an output end opposite the coating tool mounting end, which output end is adapted to be positioned in proximity of the surface of the object to be coated,
- wherein in operation:
  - the spray coating tool is mounted at the coating tool mounting end, and
  - the output end is positioned in proximity of the surface of the object to be coated, and
  - the spray coating tool is operated to spray atomised coating particles which travel from the coating tool, through the spray chamber and the output end to the surface of the object,
- a carrier gas installation in communication with the coating tool mounting end of the conditioning hood or with the coating tool, adapted to provide a carrier gas that in operation carries the atomised coating.

Possible objects that are suitable to be coated according to the invention are ships, aircraft such as airplanes, helicopters, rockets, satellites, buildings, and infrastructural components such as parts of bridges, locks and water barriers.

A coating layer is applied by moving the spray coating tool over the surface. The movement can be carried out manually or automatically, at a coating speed. In embodiments, a drive with an adjustable coating speed is provided for moving the spray coating tool.

One or more layers of coatings are commonly applied, contributing to the protection of the object. For example anti-corrosion layers are applied, colour layers and/or protective varnish layers. Generally, the term 'coating' is used for the deposited layer.

'Coating material' is used to identify the composition that is being deposited, i.e. prior to spraying. Commonly, water-based or solvent based coating material compositions are applied, especially water-based or solvent-based paints. The amount of water of solvent can be varied to change the viscosity of the coating material.

In embodiments, a coating material supply is provided with a heating element for the coating material supply, to be able to change the temperature and hence the viscosity of the coating material. The heating element can both be used for heating and for cooling the coating material.

The spray coating tool sprays atomised coating particles. The spray coating tool generally comprises a spray nozzle to facilitate the dispersion of a coating material, e.g. the breakup of a coating fluid into drops, also referred to as nebulize, and discharge the them into a spray of atomised coating particles. Preferably a spray nozzle having a single outlet is applied.

The coating material can be solid or liquid. A solid coating material is e.g. a powder, such that the atomised coating particles are solid powder particles. A liquid coating material can have a relatively high viscosity, but the system of the invention is also suitable for liquid coating material with a low viscosity. The atomised coating particles are droplets. It is also conceivable that the liquid coating material comprises dispersed particles.

A conditioning hood is provided defining a spray chamber. The geometry and dimensions of the conditioning hood are advantageously tuned to the spray coating tool and/or the type of coating and/or the object. Advantageously, the spray coating tool generates a conical spray, and the conditioning hood has a corresponding conical shape. The conditioning hood has a coating tool mounting end, preferably closing off the spray chamber at this coating tool mounting end. Opposite thereof an output end is provided, which output end is adapted to be positioned in proximity of a surface of the object to be coated. The conditioning hood is advantageously formed to obstruct the dispersion of droplets in at least one unwanted direction.

In embodiments, the conditioning hood has an increasing diameter from the coating tool mounting end towards the output end. For example, the conditioning hood has an essentially conical shape with the coating tool mounting end of the conditioning hood at a side of the hood with a relatively small opening, and the output end of the conditioning hood at a side of the hood with a relatively large opening. The cone tapers from the output end to a fictional apex where the coating tool can be mounted.

In alternative embodiments, the conditioning hood is of a generally cylindrical shape having non-tapering walls.

The output end of the conditioning hood is advantageously circular, but elliptical or a polygonal base is also conceivable.

The conditioning hood can be produced from any type of material, including 3D-printed plastics. Advantageously, a provision is made for removing static electricity.

To carry out a coating with a system according to the invention, in operation:

- the spray coating tool is mounted at the coating tool mounting end, and
- the output end is positioned in proximity of the surface of the object to be coated, and
- the spray coating tool is operated to spray atomised coating particles which travel from the coating tool, through the spray chamber and the output end to the surface of the object.

The system comprises a carrier gas installation in communication with the coating tool mounting end of the conditioning hood or with the coating tool, adapted to provide a carrier gas that in operation carries the atomised coating particles.

The carrier gas is suitable to carry atomised coating particles. Such a suspension of solid coating particles or liquid coating droplets in a carrier gas is generally referred to as an aerosol, in particular a spray jet aerosol. In such an aerosol, particles are present with a particle size in the range of a molecule to 1 mm, in particular between 500 nm and 200 μm.

A possible function of the carrier gas is to carry residual atomised coating particles from the spray chamber to the output end of the conditioning hood, towards the inner annular duct and to the gas extraction installation. In embodiments, it is possible for a spray coating tool to spray the atomised coating particles 'airless'. In such embodiments the spray is not gas-assisted.

In embodiments, the carrier gas may also assist the spray in carrying particles from the spray coating tool to the surface of the object. It is also possible that the carrier gas attributes to the atomisation process. It may then referred to as 'atomisation gas'.

An advantage of the carrier gas carrying atomised coating particles is that it prevents the particles from adhering to the inner wall of the conditioning hood defining the spray chamber. The carrier gas thus shields the walls of the spray chamber.

In embodiments, a carrier gas injection installation is provided, adapted to inject a carrier gas. Such an installation may use a gas pump, e.g. a centrifugal fan, to provide pressurized carrier gas into the spray chamber.

Alternatively, the carrier gas installation is formed by one or more openings at the coating tool mounting end, e.g. allowing the introduction of ambient air.

Commonly air is used as a carrier gas, but other gases are also conceivable. This may e.g. be dependent on the type of coating material, in particular the type of diluent or solvent that is used.

The actual spray jet forming the coating on the object is often referred to as the primary or main jet. The term 'overspray' is used to refer to the application of coating particles onto an unintended location.

The main jet comprises atomised coating particles, optionally carrier gas, and possibly also a binder and a diluent or solvent. Only the particles, and possibly a binder will form the coating on the object. The carrier gas and possibly the diluent will not adhere to the surface, and will move to towards a lower pressure zone, i.e. outside the spray chamber. It is known that smaller particles will more easily follow a gas stream than relatively larger particles. Hence, the smallest atomised coating particles will cause overspray. In other words, the smaller the atomised particles, the larger the amount of overspray and the smaller the transfer efficiency.

According to a second aspect of the invention, the problems associated with overspray are reduced by a system for coating a surface of an object with a spray coating tool spraying atomised coating particles, for example paint, comprising

- a conditioning hood defining a spray chamber and having
  - a coating tool mounting end,
  - an output end opposite the coating tool mounting end, which output end is adapted to be positioned in proximity of the surface of the object to be coated, wherein in operation:
  - the spray coating tool is mounted at the coating tool mounting end, and
  - the output end is positioned in proximity of the surface of the object to be coated, and
  - the spray coating tool is operated to spray atomised coating particles which travel from the coating tool, through the spray chamber and the output end to the surface of the object,
- a carrier gas installation in communication with the coating tool mounting end of the conditioning hood or with the coating tool, adapted to provide a carrier gas that in operation carries the atomised coating, wherein the conditioning hood has three concentric walls, namely outer wall, intermediate wall and inner wall, the inner wall defining the spray chamber, the outer wall and the intermediate wall defining an annular outer duct and the intermediate wall and the inner wall defining an and inner annular duct,

- a gas extraction installation in communication with the inner annular duct, adapted to extract gas with residual atomised coating particles adjacent the output end of the conditioning hood,
- a shielding fluid injection installation in communication with the outer annular duct, adapted to inject shielding fluid to the outer annular duct which leaves the annular duct at the output end thereof, thereby shielding the spray chamber from the environment.

Another advantage of the conditioning hood of this aspect of the invention is that enhanced control of the spraying conditions is possible. The inventive construction of the conditioning hood attributes to keeping conditions during spraying at a constant level, such as temperature and humidity.

The conditioning hood has a concentric outer wall, intermediate wall and inner wall. The inner wall defines the spray chamber, the outer wall and the intermediate wall defining an annular outer duct and the intermediate wall and the inner wall defining an and inner annular duct.

In embodiments, the three concentric walls of the conditioning hood are provided are parallel to each other. Possibly, the annular ducts have the same width over the entire length of the conditioning hood. However, other configurations are also conceivable. For example, the shape of the outer wall may be cylindrical, in combination with a conical inner wall. The intermediate wall may be cylindrical or conical. In such embodiments, only two of the three concentric walls are parallel to each other.

In embodiments, the distance between the concentric walls is adjustable.

The configuration of the conditioning hood may be such that the spray coating tool is mounted at the coating tool mounting end to the inner wall of the three concentric walls only.

It is conceivable that the three concentric walls of the conditioning hood have the same distance to the surface of the object to be coated. However, it is also possible that the distance $d_i$ between the inner wall and the surface differs from the distance $d_o$ between the outer wall and the surface. The distance $d_m$ between the intermediate wall and the surface may be the same as the distance $d_o$ between the outer wall and the surface, the distance $d_i$ between the inner wall and the surface or be different from these.

Possibly, the above-defined distances $d_o$, $d_m$ and $d_i$ of a conditioning hood are chosen or tuned to the coating process prior to operation of the spray coating tool.

It is also conceivable that one or more of the above-defined distances $d_o$, $d_m$ and $d_i$ of a conditioning hood can actively be tuned during spraying, e.g. by a central control system based on input data from a particle sensor provided in the conditioning hood.

In embodiments, a spray chamber adjustment mechanism is provided for adjusting the distance $d_i$ between the surface of the object and the inner wall defining the spray chamber at the output end of the conditioning hood. Possibly, the amount of overspray may be reduced by decreasing the distance $d_i$ between the surface of the object and the inner wall. It is also conceivable the amount of overspray will increase by decreasing the distance $d_i$ beyond an optimum.

In embodiments, an outer wall adjustment mechanism is provided for adjusting the distance $d_o$ between the surface of the object and at least the outer concentric wall at the output end of the conditioning hood. The outer wall provides a mechanical shielding of the output end of the conditioning hood, in particular of the inner annular duct and the spray chamber. Advantageously, the central control system is communicatively connected to the particle sensor and to the outer wall adjustment mechanism, for controlling the coating process by adjusting the distance $d_o$ based on input data from the particle sensor.

Possibly, also an intermediate wall adjustment mechanism is provided to be able to adjust the distance $d_m$ between the outer annular duct and the surface of the object. Advantageously, the central control system is communicatively connected to the particle sensor and to the intermediate wall adjustment mechanism, for controlling the coating process by adjusting the distance $d_m$ based on input data from the particle sensor.

The gas extraction installation in communication with the inner annular duct will extract gas, and possibly diluent or solvent such as volatile organic compounds, and residual atomised coating particles adjacent the output end of the conditioning hood, in particular adjacent the spray chamber. By extracting the residual atomised coating particles, overspray is minimized. Advantageously, one or more filters are applied in the inner annular duct and/or in the gas extraction installation to filter the residual coating particles from the gas. After filtering, the gas can be recycled for re-use or emitted into the environment.

In embodiments, a gas extraction installation uses a gas pump, e.g. a centrifugal fan, to create a partial vacuum. Such a vacuum causes the sucking up of carrier gas from the spray chamber. In such embodiments, the carrier gas installation can be passive in that it provides a carrier gas, e.g. via openings at the coating tool mounting end, but not use a pump to provide a pressurized carrier gas.

In alternative embodiments, it is conceivable that an actively operated carrier gas injection installation is provided, to provide pressurized carrier gas into the spray chamber. In such embodiments, it is conceivable that the gas extraction installation is passive.

The shielding fluid injection installation injects shielding fluid. The shielding fluid can be formed by a liquid, a gas or a plasma. In embodiments, air is used as a shielding gas. Possibly, the air is purified or cleaned in that contaminants are removed. Possible contaminants are all types of particles, but could also include gases such as $CO_2$. The shielding fluid prevents external airflows from disturbing the spraying process. In embodiments, the shielding fluid injection installation uses a pump, e.g. a centrifugal fan, to provide the shielding fluid, preferably a pressurized shielding fluid.

It is also conceivable that the shielding fluid attributes to the coating process, in that it provides a pre-treatment or after-treatment of the actual particle spraying. It is conceivable that the shielding fluid comprises additives. Alternatively, or in addition, the shielding fluid has a temperature or composition that influences/effects the coating process, e.g. curing, drying or hardening of the coating. The shielding fluid may also assist in removing, i.e. blowing away, dust on a deposited coating layer. Pre-heating the surface of the object to be coated could also be advantageous.

In this respect, it is conceivable that the annular outer duct comprises a leading part, physically separated from a trailing part, allowing a shielding fluid advantageous for pre-treatment to enter the leading part, and a shielding fluid advantageous for after-treatment to enter the trailing part.

The invention also relates to a method for coating a surface of an object with a spray coating tool spraying atomised coating particles, wherein use is made of a system as described above, comprising the steps of:

mounting the spray coating tool at the coating tool mounting end, and positioning the output end in proximity of the surface of the object to be coated, and operating the spray coating tool to spray atomised coating particles which travel from the coating tool, through the spray chamber and the output end to the surface of the object.

According to a first aspect of the invention, the problems associated with overspray are reduced by a system for coating a surface of an object with a spray coating tool spraying atomised coating particles, for example paint, comprising a coating material supply in communication with the coating tool, comprising a coating material pump setting the coating material flow rate, a conditioning hood defining a spray chamber and having a coating tool mounting end, an output end opposite the coating tool mounting end, which output end is adapted to be positioned in proximity of the surface of the object to be coated, wherein in operation:

the spray coating tool is mounted at the coating tool mounting end, and the output end is positioned in proximity of the surface of the object to be coated, and the spray coating tool is operated to spray atomised coating particles which travel from the coating tool, through the spray chamber and the output end to the surface of the object, a carrier gas installation in communication with the coating tool mounting end of the conditioning hood or with the coating tool, adapted to provide a carrier gas that in operation carries the atomised coating particles, characterized in that the system further comprises a particle sensor provided in the conditioning hood, e.g. in the spray chamber, detecting the particle size distribution and/or the particle density, a central control system communicatively connected to the particle sensor and to the coating material supply and/or the carrier gas installation, for controlling the coating process based on input data from the particle sensor, such as the coating material flow rate.

An important advantage of the system according to the invention is that the coating quality is improved.

The particle sensors is possibly a commonly available sensor. Possibly, the particle sensor is an optical sensor like a phase Doppler particle analyser. To diminish overspray of the smallest particles, it is desired to provide a particle sensor detecting the particle size distribution. The particle size distribution is generally a list of values that defines the relative amount, e.g. by mass, of particles present according to size.

In addition, it is useful to detect the amount of particles, in particular the particle density or concentration of particles.

Advantageously, the particle sensor is a spray particle sensor. It possibly also detects the speed of the atomised coating particles in the spray.

The central control system is provided for controlling the coating process, and in particular reducing the overspray and increasing the efficiency and quality of the coating process, based on input data from the particle sensor. It is also conceivable that the central control system controls the coating process such that coating speed is increased, or such that curing of the coating is optimal.

It is commonly known that there is a relationship between the spray coating tool and the particle size distribution and concentration. Accordingly, it is known to control a spray coating tool based on input data from a particle sensor.

According to the first aspect of the invention, the central control system is communicatively connected to the coating material supply, the conditioning hood and/or the carrier gas installation.

When the central control system is communicatively connected to the coating material supply, it is possible to control the coating material flow rate based on input data from the particle sensor. For example, the coating flow rate is increased when the average particle size is too small.

In embodiments, the coating material supply further comprises a heating element for heating and/or cooling the coating material, and wherein the temperature of the coating material is controlled on the basis of the input of the particle sensor. For example, the coating material temperature is decreased, and hence the viscosity is increased, when the average particle size is too small.

When the central control system is communicatively connected to the carrier gas installation, it is possible to control the provision of carrier gas based on input data from the particle sensor. For example, the amount of carrier gas rate is decreased when there is a large amount of small particles. In embodiments wherein the carrier gas installation is formed by one or more openings at the tool mounting, it is conceivable that the opening is increased or the number of openings is increased.

In embodiments wherein the carrier gas installation comprises a carrier gas pump setting the gas flow rate with which the carries gas is injected into the spray chamber, the central control system may communicatively be connected to the carrier gas pump to control the gas flow rate based on input data from the particle sensor. For example, the carrier gas flow rate is increased when the average particle size is too large. Or the carrier gas flow rate is decreased when there is a large amount of small particles. This may result in distinct coating surface qualities.

In embodiments, the carrier gas installation comprises a moisturizer for adjusting the humidity of the carrier gas. Advantageously, the humidity of the carrier gas is controlled on the basis of the input of the particle sensor and/or a humidity sensor.

In embodiments, the carrier gas installation comprises a heating element for adjusting the temperature of the carrier gas. Advantageously the temperature of the carrier gas is controlled on the basis of the input of the particle sensor.

In embodiments, the conditioning hood has two concentric walls, defining an annular duct and the spray chamber inside of the annular duct, wherein a gas extraction installation is in communication with the annular duct, adapted to extract gas with residual atomised coating particles adjacent the output end of the conditioning hood. Preferably, the gas extraction installation comprises a pump setting the extraction rate. In such embodiments it is possible to control the extraction rate on the basis of the input of the particle sensor.

In embodiments, a filter comprising a particle sensor is provided in the inner annular duct of the conditioning hood or in the gas extraction installation. Advantageously, this particle sensor is communicatively connected to central control system to allow control of the coating process based on input data of this sensor.

In embodiments, a drive with an adjustable coating speed is provided for moving the spray coating tool, to apply the coating layer. Advantageously, this drive is communicatively connected to central control system to allow control of the coating process by controlling the coating speed.

Hence, the particle sensor provided in the conditioning hood may be provided in the spray chamber, and/or a particle sensor associated with the gas extraction process is provided in the annular duct of the conditioning hood.

In embodiments, an additional external particle sensor is provided, outside the conditioning hood. Such and external sensor is used for sensing particles present in the environment, and can be used for reference.

It is within the scope of the invention that one or both of the particle sensors are communicatively connected to the central control system.

In embodiments, the conditioning hood has three concentric walls, namely an outer wall, intermediate wall and inner wall, the inner wall defining the spray chamber, the outer wall and the intermediate wall defining an annular outer duct and the intermediate wall and the inner wall defining an and inner annular duct;

- a gas extraction installation in communication with the inner annular duct, adapted to extract gas with residual atomised coating particles adjacent the output end of the conditioning hood, the gas extraction installation preferably comprising a pump setting the extraction rate;
- a shielding fluid injection installation in communication with the outer annular duct, adapted to inject shielding fluid to the outer annular duct which leaves the annular duct at the output end thereof, thereby shielding the spray chamber from the environment, the shielding fluid injection installation preferably comprising a shielding fluid pump setting the pressure of the shielding fluid;
- wherein the gas extraction rate is controlled on the basis of the input of the particle sensor and/or wherein the pressure of the shielding fluid is controlled on the basis of the input of the particle sensor.

In embodiments, a spray chamber adjustment mechanism is provided for adjusting the distance $d_i$ between the surface of the object and the conditioning hood defining the spray chamber at the output end of the conditioning hood, and wherein the distance $d_i$ is controlled on the basis of the input of the particle sensor. The central control system is communicatively connected to the particle sensor and to spray chamber adjustment mechanism, for controlling the coating process by adjusting the distance $d_i$ based on input data from the particle sensor. For example, the distance is decreased when there are too many small particles, as a way to reduce the amount of small particles.

In general, the distance d between the conditioning hood and the surface of the object to be coated is at least 10 mm, in case the surface comprises welds.

In embodiments, an outer wall adjustment mechanism is provided for adjusting the distance $d_o$ between the surface of the object and at least the outer concentric wall at the output end of the conditioning hood. The outer wall provides a mechanical shielding of the output end of the conditioning hood, in particular of the inner annular duct and the spray chamber.

Possibly, also an intermediate wall adjustment mechanism is provided to be able to adjust the distance $d_m$ between the outer annular duct and the surface of the object.

In exemplary embodiments, it is possible to control spray chamber conditions such as pressure and temperature and lighting. Advantageously, such spray chamber conditions are controlled on the basis of the particle sensor.

In addition to the particle sensor provided in the spray chamber, it is also conceivable that a temperature and/or humidity sensor is provided, e.g. in the spray chamber, which is also communicatively connected to central control system to allow control of the coating process based on input data of these sensors.

The invention also relates to a method for coating a surface of an object with a spray coating tool spraying atomised coating particles onto wherein use is made of a system as described herein, comprising the steps of:

- mounting the spray coating tool at the coating tool mounting end, and
- positioning the output end in proximity of the surface of the object to be coated, and
- operating the spray coating tool to spray atomised coating particles which travel from the coating tool, through the spray chamber and the output end to the surface of the object, and during operation of the spray coating tool detecting the particle size and/or particle density,
- controlling the coating material flow rate and/or the carrier gas flow rate on the basis of the data of the particle sensor.

Aspects of the disclosure are advantageously also applied in the invention, and vice versa. Both aspects of the disclosure can be applied separately but also in combination.

Figure 2:
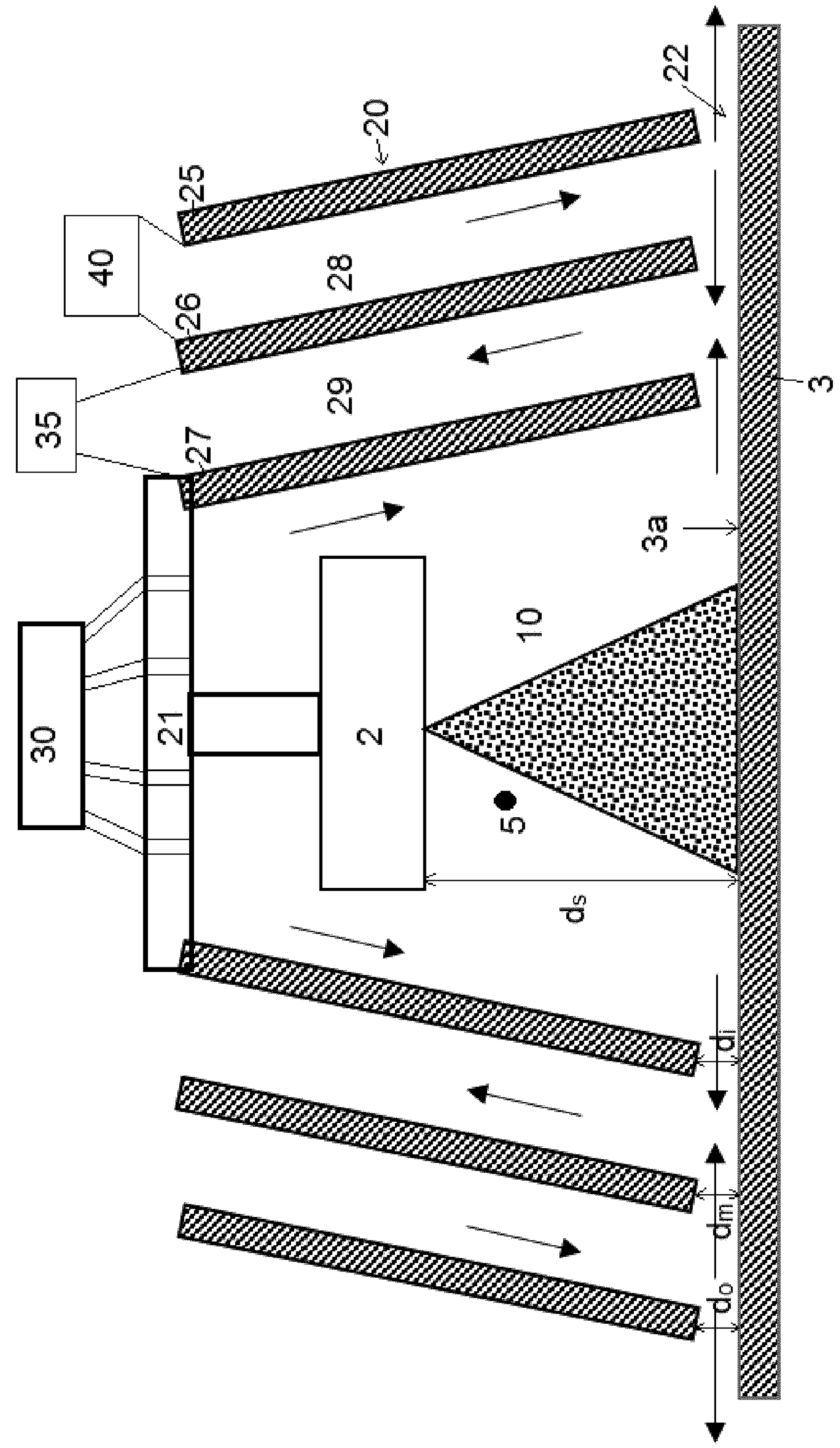
Figure 3:
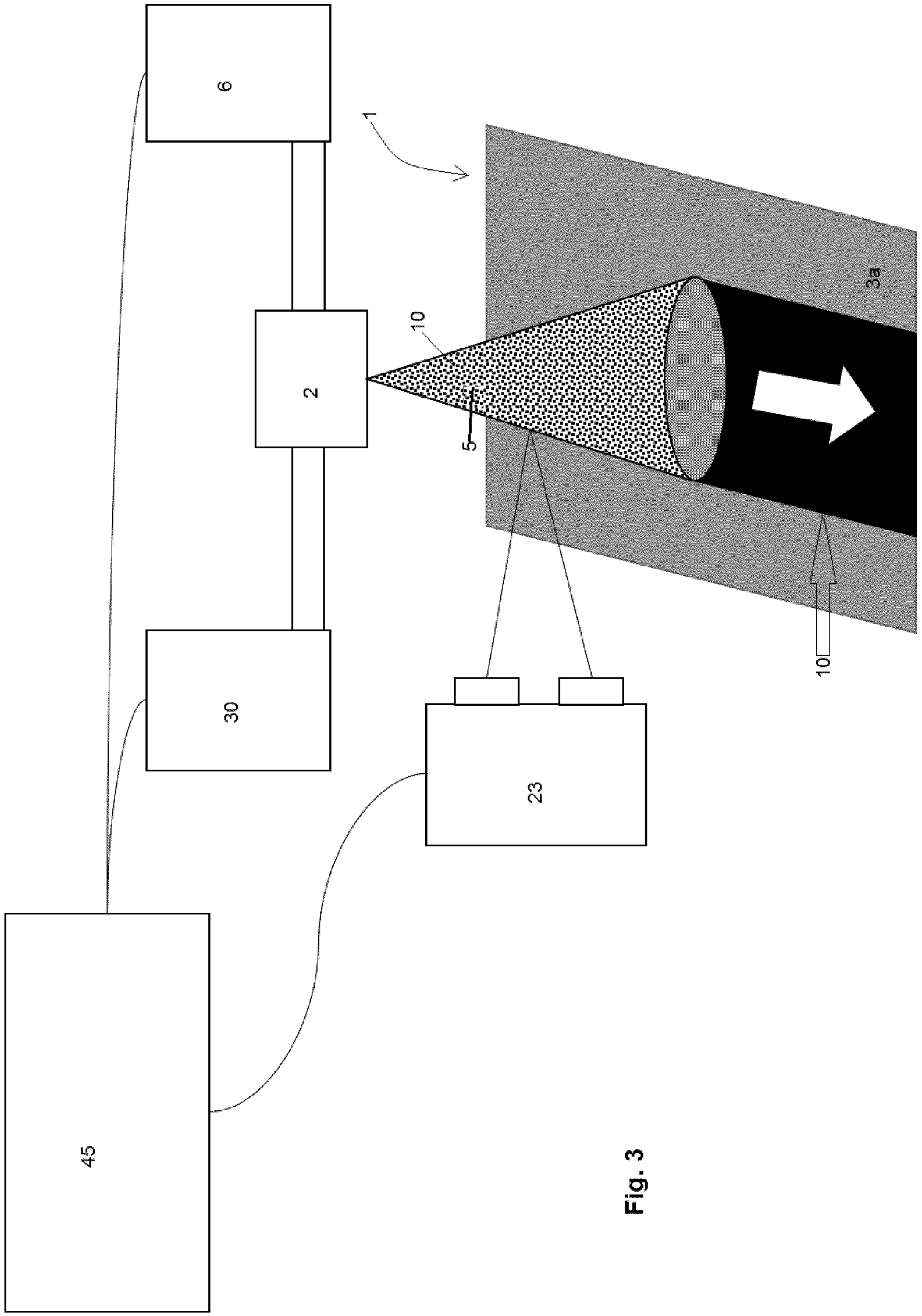
Figure 4:
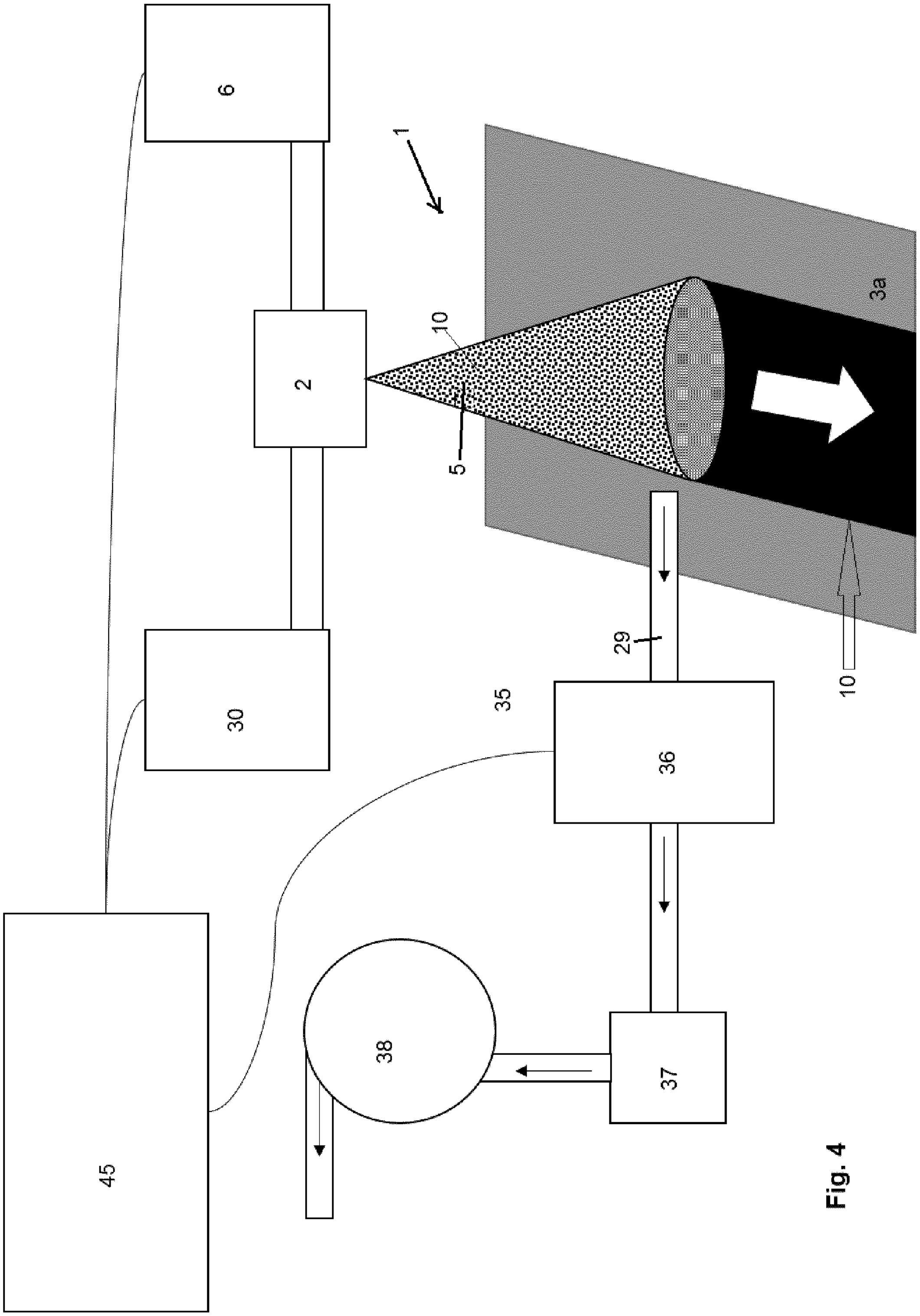

The invention is furthermore elucidated in relation to the drawings, in which:

FIG. 1 schematically depicts a system for coating according to the prior art;

FIG. 2 schematically depicts a system for coating according to the second aspect of the invention;

FIG. 3 schematically depicts a system for coating according to the first aspect of the invention;

FIG. 4 schematically depicts an alternative system for coating according to the first aspect of the invention.

In FIG. 1 a prior art system 1 for coating with a spray coating tool 2 spraying atomised coating particles 10, for example paint, onto a surface 3*a* of an object 3 is shown. Visible is that an external factor, such as wind 8, causes overspray 11.

Generally, when the distance between the spray coating tool 2 and the surface is 5-10 cm, the least effect from external factors is experienced. With larger distances, the transfer efficiency of coating particles adhering onto the surface reduces significantly.

The optimum particle size of atomised coating particles to effectively adhere onto the surface and form a coating may deviate up to 10-15%, depending on the type of coating material.

In general, the type of coating material determines an associated spray coating tool and nozzle.

In FIG. 2 a system 1 is shown according to the invention. The shown system 1 coats a surface 3*a* of an object 3 with a spray coating tool 2 spraying atomised coating particles 10, for example paint. The system comprises a conditioning hood 20 defining a spray chamber 5.

In the inventive system, the distance between the spray coating tool 2 and the surface is ~10 cm for smaller surfaces, and can be increased up to 30 cm for larger objects to be coated.

The conditioning hood has:

- a coating tool mounting end 21, possibly closing off the spray chamber at this coating tool mounting end,
- an output end 22 opposite the coating tool mounting end, which output end is adapted to be positioned in proximity of the surface of the object to be coated.

In operation:

- the spray coating tool is mounted at the coating tool mounting end, and
- the output end is positioned in proximity of the surface of the object to be coated, and
- the spray coating tool is operated to spray atomised coating particles which travel from the coating tool, through the spray chamber and the output end to the surface of the object.

The system further comprises a carrier gas installation 30, which in operation is in communication with the coating tool mounting end 21 of the conditioning hood or with the coating tool, adapted to provide a carrier gas that in operation carries the atomised coating.

The shown conditioning hood 20 according to the second aspect of the invention has three concentric walls, namely outer wall 25, intermediate wall 26 and inner wall 27, the inner wall defining the spray chamber 5, the outer wall and the intermediate wall defining an annular outer duct 28 and the intermediate wall and the inner wall defining an and inner annular duct 29.

The system of the invention further comprises a gas extraction installation 35, schematically shown, in communication with the inner annular duct 29, adapted to extract gas with residual atomised coating particles adjacent the output end of the conditioning hood.

Furthermore, the system comprises a shielding fluid injection installation 40 in communication with the outer annular duct 28, adapted to inject shielding fluid to the outer annular duct which leaves the annular duct at the output end thereof, thereby shielding the spray chamber from the environment.

FIGS. 3 and 4 depicts a system 1 for coating according to a first aspect of the invention. The system 1 is a system for coating a surface 3*a* of an object 3 with a spray coating tool 2 spraying atomised coating particles 10, for example paint. The system comprises a coating material supply 6 in communication with the coating tool 2. The coating material supply 6 comprises a coating material pump (not shown in detail) setting a coating material flow rate.

The system further comprises a conditioning hood, not shown, e.g. the hood as shown in FIG. 2, or a conditioning hood as known from the prior art, defining a spray chamber 5.

The conditioning hood has a coating tool mounting end and an output end opposite the coating tool mounting end, which output end is adapted to be positioned in proximity of the surface of the object to be coated. In operation:

- the spray coating tool 2 is mounted at the coating tool mounting end, and
- the output end is positioned in proximity of the surface of the object to be coated, and the spray coating tool is operated to spray atomised coating particles which travel from the coating tool, through the spray chamber and the output end to the surface of the object.

Possibly, the step of providing the coating material supply 6 into communication with the coating tool 2 is a separate step.

The system further comprises a carrier gas installation 30. In operation, the carrier gas installation is in communication with the coating tool mounting end of the conditioning hood or with the coating tool 2, and is adapted to provide a carrier gas that in operation carries the atomised coating particles In the embodiment shown in FIG. 4, a gas extraction installation 35 is schematically shown, comprising a pump 38 setting the extraction rate, a filter 37 and a particle sensor 36 provided in an annular duct 29 defined by two concentric walls (not visible) of the conditioning hood, as shown in detail in FIG. 2.

In the system according to the first aspect of the invention, a particle sensor is provided in the conditioning hood, detecting the particle size distribution and/or the particle density. In FIG. 3, the particle sensor 23 is provided in the spray chamber. In the embodiment of FIG. 4, the particle sensor 36 is provided in the annular duct 29.

According to the first aspect of the invention, a central control system 45 is provided which is communicatively connected to the particle sensor 23, 36 and to the coating material supply 6 and/or the carrier gas installation 30, for controlling the coating process based on input data from the particle sensor, such as the coating material flow rate.

Examples of parameters that can be controlled based on input data from the particle sensor are:

- a distance ds between the spray coating tool 2 and the object surface 3*a;*
- a distance $d_i$ between the inner wall defining the spray chamber 27 and the surface of the object 3*a;*
- a distance $d_m$ between the intermediate wall 26 and the surface of the object 3*a;*
- a distance $d_o$ between the outer wall 25 and the surface of the object 3*a;*
- the coating material flow rate;
- the carrier gas flow rate, e.g. by controlling a carrier gas injection pump and/or by controlling a gas extraction pump;
- the ratio between coating material and carrier gas;
- the viscosity of the coating material, e.g. by adding water or solvent, or by controlling the temperature of the coating material;
- the temperature in the spray chamber 5;
- the humidity in the spray chamber 5.

In the embodiment of FIG. 4, it is also conceivable that the central control system 45 is communicatively connected to the pump 38 of the extraction installation.

The invention claimed is:

1. A system for coating a surface of an object with a spray coating tool spraying atomised coating particles, comprising:

a conditioning hood defining a spray chamber and having:

a coating tool mounting end; and an output end opposite the coating tool mounting end, the output end is configured to be positioned in proximity of the surface of the object to be coated, wherein:

the spray coating tool is mounted at the coating tool mounting end; and the output end is positioned in proximity of the surface of the object to be coated; and the spray coating tool is operated to spray atomised coating particles which travel from the coating tool, through the spray chamber and the output end to the surface of the object, a carrier gas installation in communication with the coating tool mounting end of the conditioning hood or with the spray coating tool, configured to provide a carrier gas to carry residual atomised coating particles from the spray chamber to the output end of the conditioning hood towards an inner annular duct;

wherein the conditioning hood has three concentric walls, namely outer wall, intermediate wall and inner wall, the inner wall defining the spray chamber, the outer wall and the intermediate wall defining an annular outer duct and the intermediate wall and the inner wall defining the inner annular duct, wherein the inner annular duct is separated from the spray chamber, wherein the inner annular duct has an outer end which extends fully separate from the spray chamber;

a gas extraction installation in communication with the outer end of the inner annular duct, configured to extract the carrier gas with the residual atomised coating particles adjacent the output end of the conditioning hood; and a shielding fluid injection installation in communication with the annular outer duct, configured to inject shielding fluid to the annular outer duct which leaves the annular outer duct at the output end thereof, thereby shielding the spray chamber from the environment.

2. The system according to claim 1, wherein the conditioning hood has a conical shape with the coating tool mounting end of the conditioning hood has a smaller opening than the output end of the conditioning hood.

3. The system according to claim 1, wherein the three concentric walls of the conditioning hood are provided are parallel to each other.

4. The system according to claim 1, wherein a spray chamber adjustment mechanism is provided for adjusting the distance $d_i$ between the surface of the object and the inner wall defining the spray chamber at the output end of the conditioning hood.

5. The system according to claim 1, wherein an outer wall adjustment mechanism is provided for adjusting the distance $d_o$ between the surface of the object and at least the outer wall at the output end of the conditioning hood.

6. The system according to claim 1, further comprising a particle sensor provided in the spray chamber detecting the particle size and/or particle density, and a central control system communicatively connected to the particle sensor and to the coating material supply and/or the carrier gas installation, for controlling the coating process based on input data from the particle sensor, such as a coating material flow rate and/or a carrier gas flow rate.

7. The system according to claim 1, further comprising a carrier gas injection installation, configured to inject a carrier gas.

* * * * *